United States Patent [19]

Gräfenstein

[11] Patent Number: 5,492,338
[45] Date of Patent: Feb. 20, 1996

[54] HOLLOW ELASTIC SEAL WITH RELEASABLY RETAINED SEALING LIP

[75] Inventor: Georg Gräfenstein, Niedernhausen, Germany

[73] Assignee: General Motors Corporation, Detroit, Mich.

[21] Appl. No.: 348,632

[22] Filed: Dec. 2, 1994

[30] Foreign Application Priority Data

Dec. 24, 1993 [DE] Germany ............................ 43 44 385.0

[51] Int. Cl.⁶ ........................................................ F16J 15/10
[52] U.S. Cl. ........................ 277/9; 277/212 FB; 280/780
[58] Field of Search .............................. 277/9, 178, 201, 277/226, 212 FB, 212 C; 74/18; 280/779, 780; 180/78; 464/173

[56] References Cited

U.S. PATENT DOCUMENTS

| | | |
|---|---|---|
| 1,629,346 | 5/1927 | Larson .................................... 277/178 |
| 1,661,878 | 3/1928 | Cromwell ............................... 277/226 |
| 2,439,469 | 4/1948 | Husted .................................... 277/226 |
| 3,208,290 | 10/1962 | Mathues et al. . |
| 3,703,106 | 11/1972 | Arntson et al. . |
| 4,509,775 | 4/1985 | Arndt . |
| 4,840,386 | 6/1989 | Petsmeier et al. ................ 277/212 FB |
| 5,312,200 | 5/1994 | Buhl et al. ........................ 277/212 FB |

Primary Examiner—Scott W. Cummings
Attorney, Agent, or Firm—Saul Schwartz

[57] ABSTRACT

In an elastic seal 6 for sealing a part passing through a motor vehicle body opening 3, e.g., a steering gear 2 or a steering column of a motor vehicle, a sealing lip 6 connected to a holding part 8 is designed as a hollow bead 5 whose free end 7 is fixed in a detachable manner to the holding part 8.

4 Claims, 3 Drawing Sheets

HOLLOW ELASTIC SEAL WITH RELEASABLY RETAINED SEALING LIP

The invention relates to an elastic seal for sealing a part passing through a motor vehicle body opening, e.g., a steering gear or a steering column of a motor vehicle, consisting of a sealing lip enclosing the body opening and a holding part supporting it.

Such elastic seals are commonly used to seal the interior space of the vehicle against air drafts, noise, water, etc. In such cases often relatively large tolerances or gaps in the region of the place being sealed must be bridged. The known elastic seals usually consist of a sealing lip arranged on a holding part and displaying a spring-acting arm which is adapted to the contour of the auto body opening. During installation this sealing lip is pressed with a defined force against a corresponding sealing area on the body. This tension is necessary in order to achieve a secure seal despite the tolerances appearing the in sealing direction and transversely to it.

In order to compensate for the tolerances and in order to achieve a longer durability these well-known seals must be designed with a correspondingly large volume. Depending on the requirements, in such cases often in order to stabilize the seal, metal or plastic inserts or frame-like structures must be used. The fabrication and installation of such seals involves relatively high costs, since on the one hand they must display the greatest possible range of elastic action, and on the other hand have a stable shape.

The objective of the present invention is accordingly to design an elastic seal of the type mentioned initially in such a way that it can be fabricated and installed at low cost and with simple means and have improved sealing properties.

This problem is solved by the fact that the sealing lip is designed as a hollow bead whose free end is detachably fixed to the holding part.

The advantages achieved by the invention consist primarily in the fact that the hollow bead formed in this way can collaborate better with the sealing area on the motor vehicle body, in which case the tension—viewed in the cross section—is generated by two spring-acting side walls of the hollow bead connected to one another. In this way the range of action of the seal is increased. Since the force of tension is distributed approximately symmetrically on these two walls, the bending moments on the foot of the sealing lip in the region of the holding part are reduced so that a correspondingly low material thickness can be chosen with a longer durability.

The production cost of such a seal is also reduced by the fact that the free arm of the sealing lip on the holding part which is shaped for the stabilizing of the seal on the foot of the sealing lip is detachably fixed. Additional parts such as metal or plastic inserts are no longer required in this case so that the seal can be fabricated from a uniform elastic material, e.g., an elastomer.

The hollow bead can be formed especially simply if the free end of the sealing lip is attached in a friction-locking or form-fitting manner to the holding part. For this purpose the holding part is provided with a circumferential groove oriented approximately in the sealing direction in which the free end of the sealing lip, which is provided with a thickening, is held by a friction-locking or form-fitting connection. The thickening is approximately circular in cross section and slightly wider in diameter than the groove so that secure holding is assured.

A simple fixation of the free end of the sealing lip to the holding part can be achieved according to an advantageous modification of the invention by the fact that the holding part has a circumferential groove running approximately perpendicular to the sealing direction in which the free end of the sealing lip, provided with an offset, is held by a friction-locking and form-fitting connection. With this configuration the connection between the free end of the sealing lip and the holding part is strengthened by the tension caused by the curved form of the sealing lip.

To reduce the time required for installation of the seal, as an alternative to this design it is possible to provide on the connecting site between the free end of the sealing lip and the holding part a conventional locking means such as a tongue and groove.

The holding part intended to stabilize the seal can be seated on the part passing through the motor vehicle body opening in a sealing manner or be arranged in a sealing manner on the body opening. In the latter case to simplify fixation to the connecting site between the body and the elastic seal conventional locking means such as back-gripping detentes or pins are provided. With this design, which is not shown in the drawing, the elastic hollow bead must collaborate with a sealing area arranged accordingly on the part passing through the motor vehicle body opening.

The invention permits numerous variations. For further illustration of its basic principle two such variations are shown in the drawing and will be described below. The drawing shows:

Figure 1:
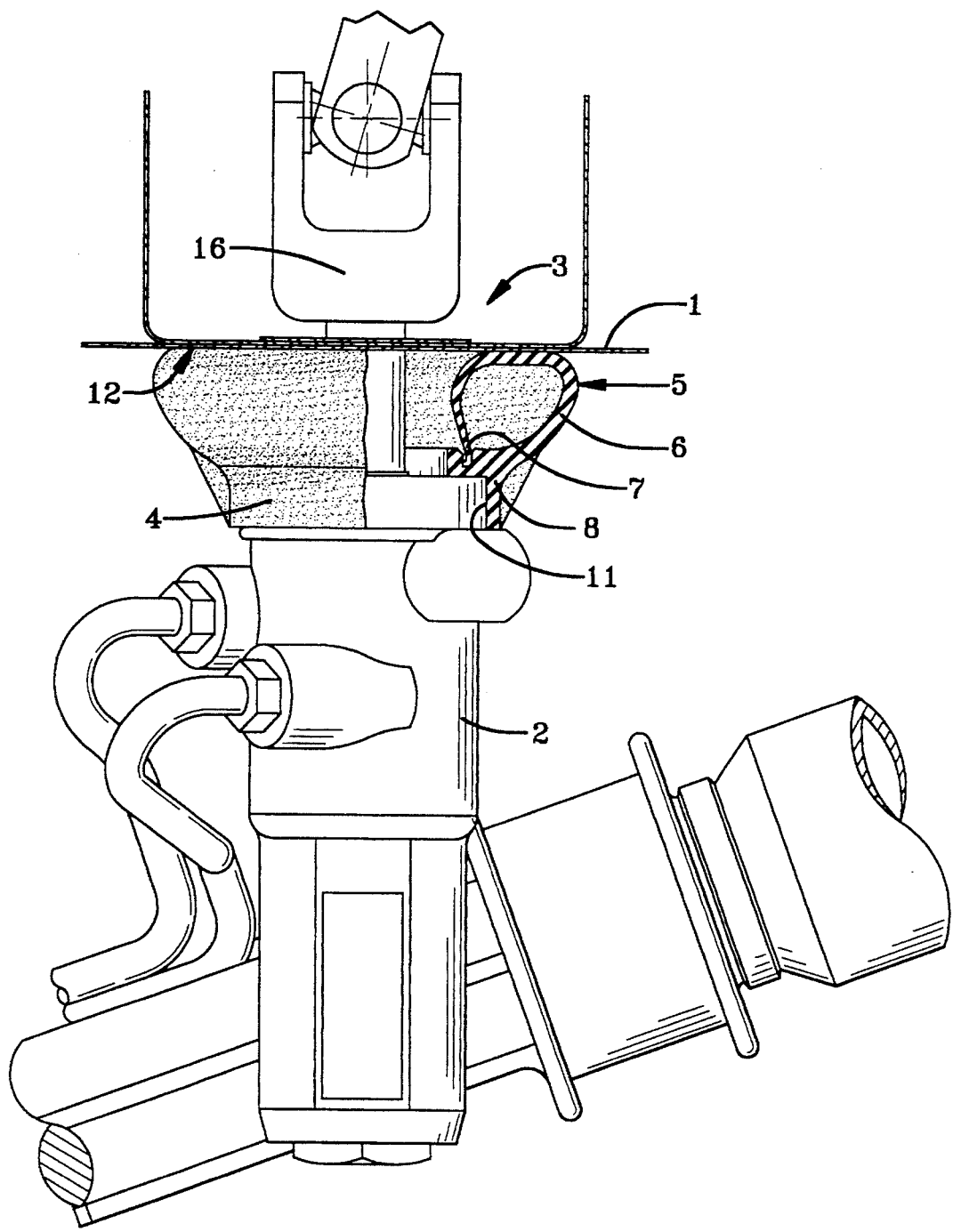
FIG. 1 is an elastic seal according to the invention partially cut away, which seals the steering gear in the region of a body opening.

In FIG. 1 the elastic seal 4 arranged between the steering gear 2 and the motor vehicle body 1 is shown in cross section. The end 16 of the steering gear 2 facing toward the body 1 passes through the body opening so that a gap is formed in the region of the body opening 3. The elastic seal 4 which fills this gap is seated in a sealing manner with the holding part 8 on the steering gear 2 while the elastic hollow bead 5 is pressed against a sealing area 12 on the body 1.

The elastic hollow bead 5 is formed by a sealing lip 6 connected to the holding part 8, whose free end 7 is fixed in a circumferential groove 9 on the holding part 8 in a friction-locking and form-fitting manner. For this purpose an O-ring-shaped thickening 10 is provided at the free end 7 which displays a slightly greater width than the groove 9 oriented perpendicular to the motor vehicle body 1 in the sealing direction.

Figure 2:
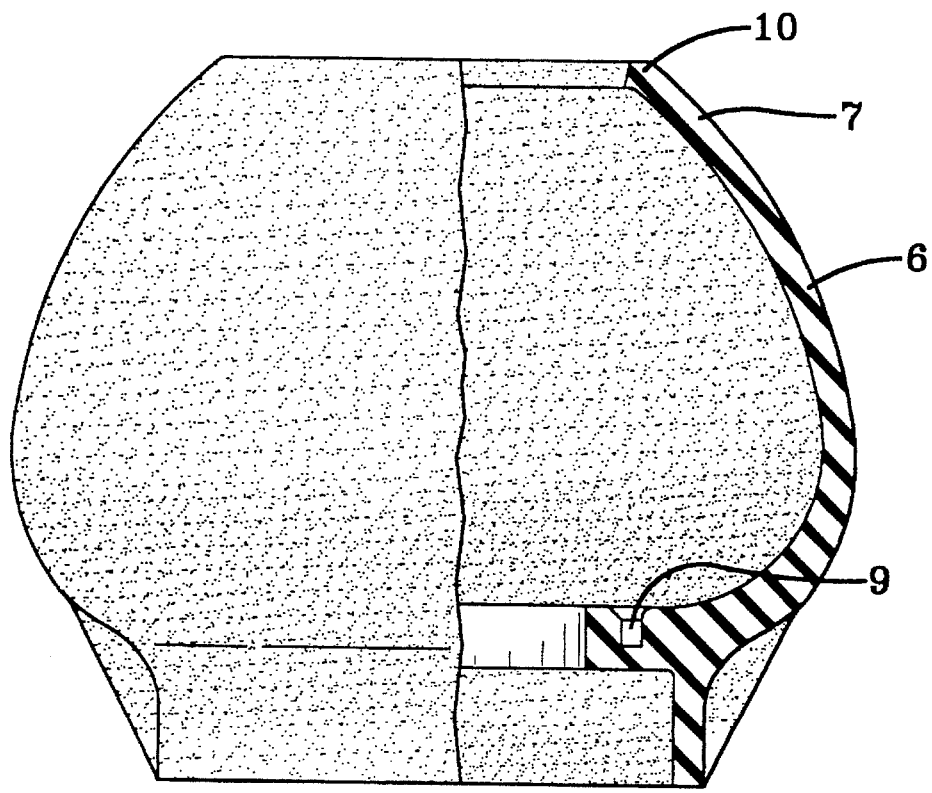
FIG. 2 is the elastic seal in FIG. 1 partially cut away in the unassembled state.
Figure 3:
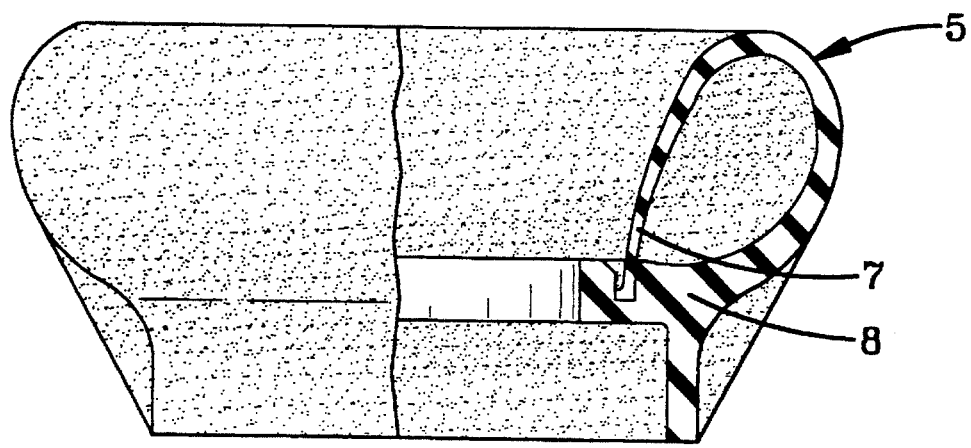
FIG. 3 is the elastic seal in FIG. 1 partially cut away in the state prepared for installation in the vehicle.

The sealing lip 6 of the elastic seal 4 in the unassembled state as shown in FIG. 2 has the shape of a hollow ball with cut off poles (manufactured state), where the edge of an opening thus formed (free end 7) as shown in FIG. 3, can be plugged into the groove 9 to form the hollow bead 5 (assembled state).

Figure 4:
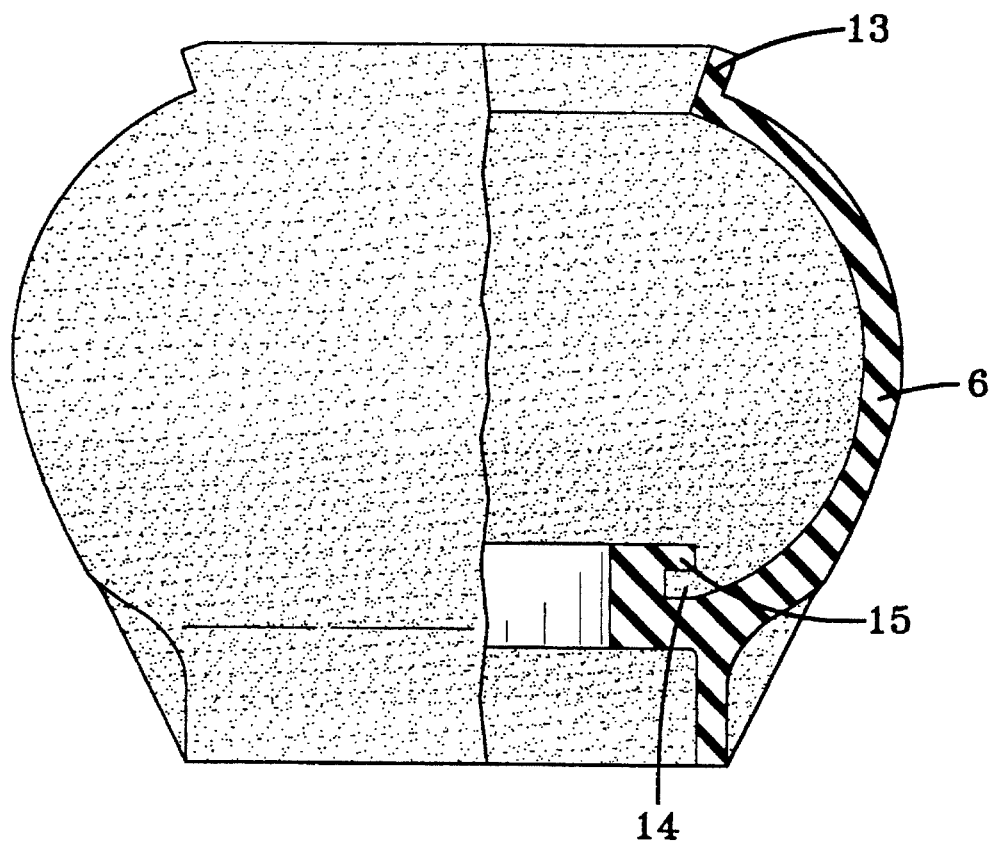
FIG. 4 is an alternative design of the elastic seal, partially cut away, with a circumferential groove oriented perpendicular to the sealing direction on the holding part in the unassembled state.
Figure 5:
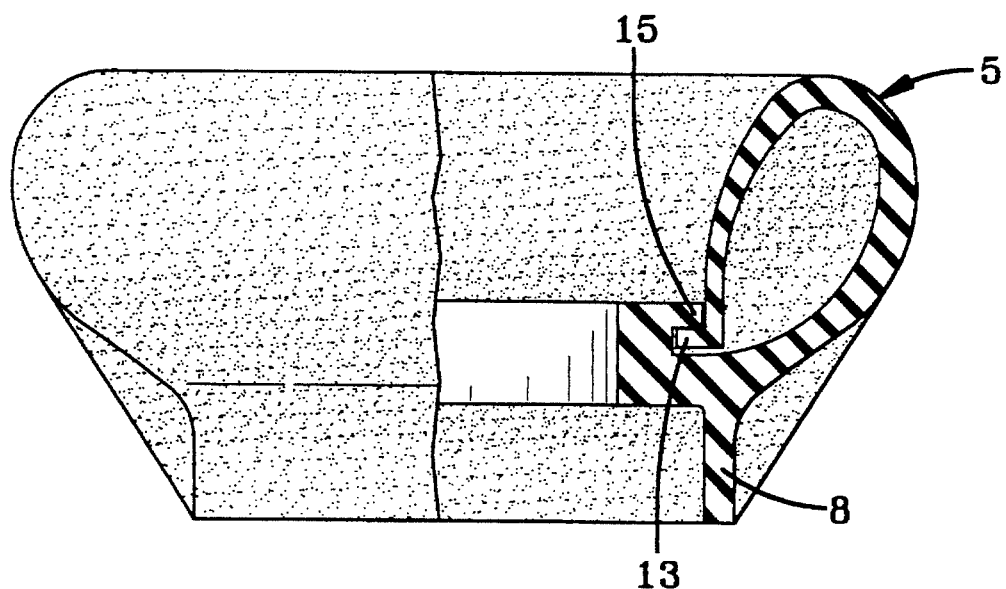
FIG. 5 is a cross section through the elastic seal in FIG. 4 in the state prepared for installation in the vehicle.

FIGS. 4 and 5 show an alternative design of the elastic sealing lip 6 which instead of the thickening 10 at the free end 7 displays an approximately rectangular offset 13. During installation the free end 7, as in the design shown in FIGS. 2 and 3, is plugged into a circumferential groove 14 to form a hollow bead shape which is oriented approximately perpendicular to the sealing direction. At this time the offset 13 engages a flange collar 15 on the holding part 8 so that secure holding is assured.

The embodiments of the invention in which an exclusive property or privilege is claimed are defined as follows:

1. In combination with a panel (1) having an opening (3) therein and an apparatus (2) adjacent said panel having a portion (16) thereof passing through said opening in said panel, a seal comprising:

an annular elastomeric holding part (8) around said portion of said apparatus passing through said opening in said panel and connected to one of said apparatus and said panel, an elastomeric sealing lip (6) integral with said holding part having an annular exposed end (7) opposite said holding part and defining a hollow bead (5) bearing against said other of said apparatus and said panel when said sealing lip is flexed inward, said annular exposed end thereof and said holding part being juxtaposed, and connection means on said holding part and on said annular exposed end of said sealing lip operative to releasably retain said sealing lip in juxtaposition to said holding part.

2. The seal recited in claim 1 wherein said connection means on said holding part and on said annular exposed end of said sealing lip includes:

a continuous annular groove (9) in said holding part, and an O-ring shaped enlargement (10) at said annular exposed end of said sealing lip larger than said annular groove and retained therein by friction when said O-ring shaped enlargement is forced into said annular groove.

3. The seal recited in claim 1 wherein said connection means on said holding part and on said annular exposed end of said sealing lip includes:

a circumferential groove (14) in said holding part having a side thereof defining a flange (15) on said holding part, and a rectangular offset (13) on said annular exposed end of said sealing lip received in said circumferential groove and retained therein by said flange on said holding part.

4. The seal recited in claim 2 wherein:

said holding part is connected to said apparatus and said hollow bead bears against said panel around said portion of said apparatus passing through said opening in said panel.

\* \* \* \* \*